(12) United States Patent
French

(10) Patent No.: US 12,362,909 B2
(45) Date of Patent: Jul. 15, 2025

(54) METHOD FOR PROCESSING ENCRYPTED DATA

(71) Applicant: Barclays Execution Services Limited, London (GB)

(72) Inventor: George French, London (GB)

(73) Assignee: Barclays Execution Services Limited, London (GB)

( * ) Notice: Subject to any disclaimer, the term of this patent is extended or adjusted under 35 U.S.C. 154(b) by 233 days.

(21) Appl. No.: 18/008,884

(22) PCT Filed: Dec. 18, 2020

(86) PCT No.: PCT/EP2020/087191
§ 371 (c)(1),
(2) Date: Dec. 7, 2022

(87) PCT Pub. No.: WO2021/249666
PCT Pub. Date: Dec. 16, 2021

(65) Prior Publication Data
US 2023/0216659 A1    Jul. 6, 2023

(30) Foreign Application Priority Data

Jun. 8, 2020 (EP) .................................... 20178830

(51) Int. Cl.
*H04L 9/06* (2006.01)
(52) U.S. Cl.
CPC .......... *H04L 9/0637* (2013.01); *H04L 9/0643* (2013.01); *H04L 9/065* (2013.01)
(58) Field of Classification Search
CPC ...... H04L 9/0637; H04L 9/0643; H04L 9/065
See application file for complete search history.

(56) References Cited

U.S. PATENT DOCUMENTS

2007/0081668 A1* 4/2007 McGrew ................ H04L 9/002
380/37
2015/0016606 A1 1/2015 Omino et al.
(Continued)

FOREIGN PATENT DOCUMENTS

DE    102008042406 A1    4/2010
JP    2019-129490 A       8/2019

OTHER PUBLICATIONS

International Search Report and Written Opinion mailed Mar. 1, 2021, in the International Application No. PCT/EP2020/087191. 8 pages.

*Primary Examiner* — Baotran N To
(74) *Attorney, Agent, or Firm* — Wilmer Cutler Pickering Hale and Dorr LLP

(57) ABSTRACT

This disclosure relates to a computer-implemented method, a data processing apparatus, a computer program, and a computer-readable storage medium for processing encrypted data. There is provided a computer-implemented method for processing encrypted data, comprising receiving a swap key, wherein the swap key is the product of an exclusive OR operation performed on a first key and a second key; receiving a first ciphertext, wherein the first ciphertext is encrypted with the first key and not encrypted with the second key; and performing an exclusive OR operation on the swap key and the first ciphertext to produce second ciphertext, such that the second ciphertext is encrypted with the second key and not encrypted with the first key.

14 Claims, 7 Drawing Sheets

(56) References Cited

U.S. PATENT DOCUMENTS

2016/0365973 A1* 12/2016 van Deventer ....... H04L 9/0625
2017/0272243 A1*  9/2017 Araki ......................... H04L 9/14
2018/0026785 A1*  1/2018 Mori .......................... H04L 9/30
                                                            713/193

* cited by examiner

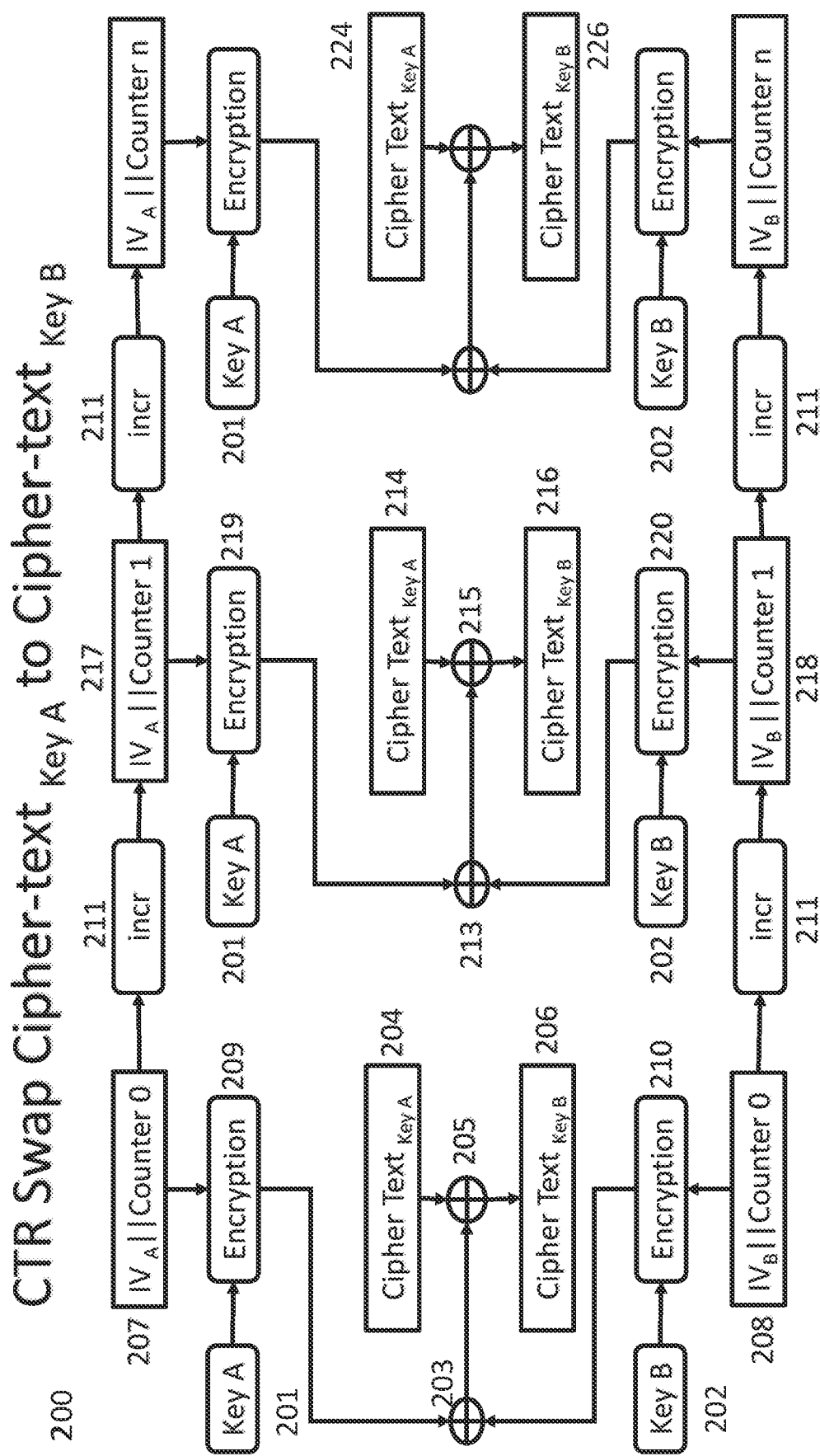

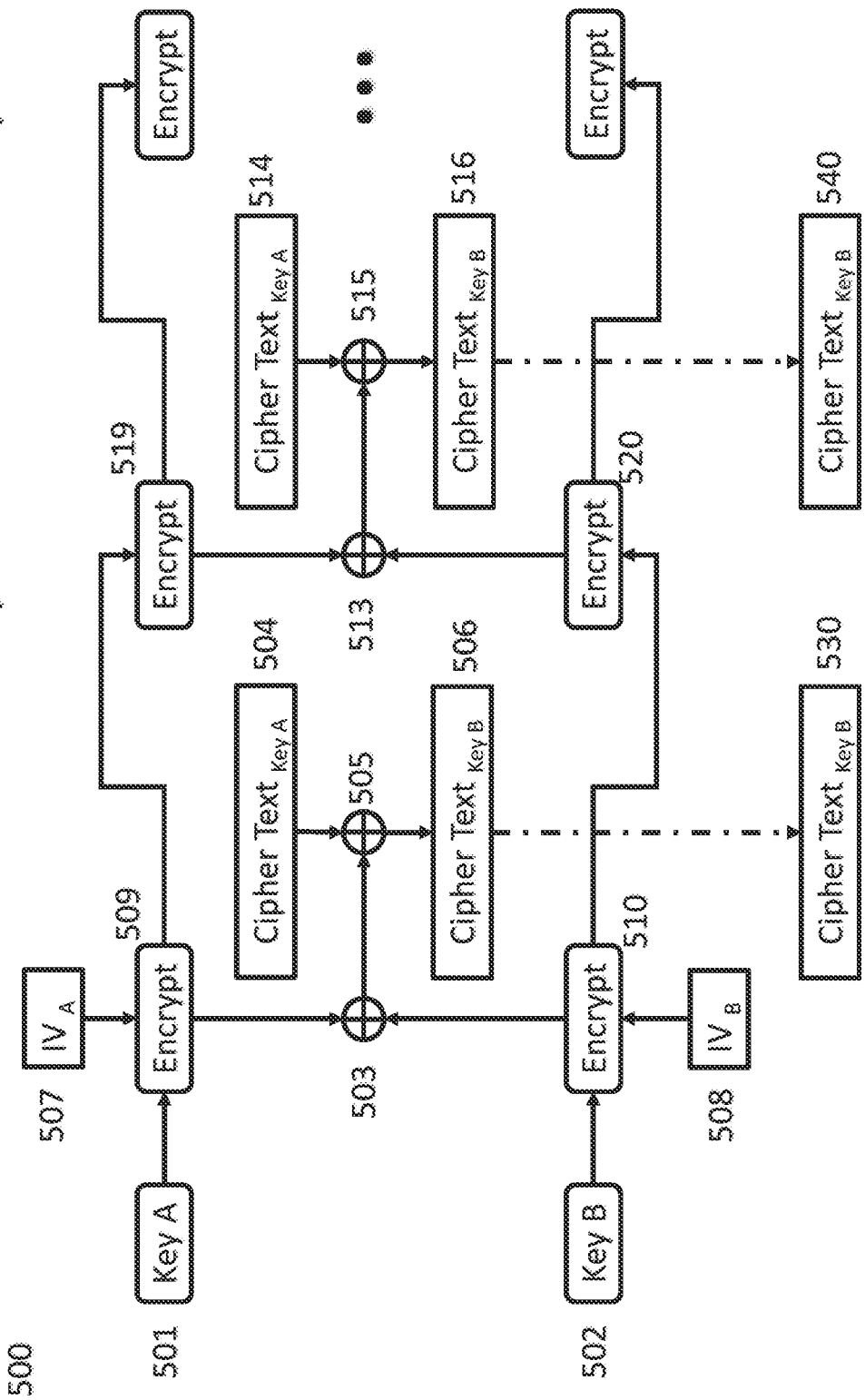

METHOD FOR PROCESSING ENCRYPTED DATA

CROSS-REFERENCE TO RELATED APPLICATIONS

This application is a U.S. national stage application of co-pending International Patent Application No. PCT/EP2020/087191, filed on Dec. 18, 2020, which claims priority to EP Patent application Ser. No. 20/178,830.4, filed on Jun. 8, 2020, the disclosures of which are hereby incorporated herein by reference in their entireties.

TECHNICAL FIELD

The invention described herein pertains to a computer-implemented method, a data processing apparatus, a computer program, and a computer-readable storage medium for processing encrypted data. For example, the disclosure below provides for the processing of encryption keys and encrypted data in a secure manner.

BACKGROUND

In the field of cryptography, data can be encrypted using a key such that the data is not readable or intelligible by a third party who does not possess a key. The data in its original state, i.e. before encryption with a key, is typically referred to as plaintext and the data in its encrypted state, i.e. after encryption with a key, is typically referred to as ciphertext.

Storing data as ciphertext, rather than as plaintext, is advantageous for data security because an attacker, in the event of a security breach, can retrieve only the ciphertext; this is unintelligible to the attacker and any other party who does not possess the key.

Once ciphertext has been encrypted, in the case of symmetric encryption, it can only be decrypted by a trusted party which has access to the same key with which it was encrypted, or, in the case of asymmetric encryption, by a party which has a private key (associated with the original encryption key). Many of the recent developments in cryptographic methods have focussed on asymmetric encryption. Asymmetric encryption has become increasingly popular, particularly in the field of secure communication, because it does not suffer from the "key exchange problem". In other words, the sharing of a single private key between two communicating parties is not required.

Currently, in order to change the way in which data is encrypted, for example to encrypt the data with a new key, the ciphertext is first decrypted using the original key and then the resulting plaintext can be encrypted using the new key.

With known methods, changing the way in which data is encrypted requires that the data appears in clear, or as plaintext, at least once during the "change" process. If the plaintext is available to view during this process, then the encryption process is rendered obsolete because the data is no longer secure for a period of time, and malicious parties can exploit this vulnerability to obtain the plaintext.

Currently, this problem can be mitigated by changing the encryption within secured hardware, for example in a hardware security module (HSM). This means that, although the plaintext does appear during the process, it is not available to an attacker because the HSM is typically installed in a secure location and the keys and data contained within the HSM are only accessible to trusted parties. Secure hardware, such as an HSM, is expensive to install and maintain, and faces compatibility issues with cloud based servers.

FIG. 1 illustrates a prior art system for processing encrypted data which may be used to modify ciphertext, such that it becomes encrypted under a new key. In a first step 10, ciphertext encrypted under Key X is transmitted to an HSM from a database at a first system. In a second step 11, the Key X, which was used to encrypt the ciphertext originally, is used to decrypt the ciphertext, producing plaintext. In a third step 12, the plaintext is encrypted using Key Y to produce ciphertext encrypted under Key Y. In a fourth and final step 13, the ciphertext encrypted under Key Y is transmitted back to the database at the first system. The system of FIG. 1 is reliant on the HSM for data security because, when the plaintext appears in clear, it must not be accessible to third parties. In order to modify encrypted data, one must either possess or have access to an HSM which, as previously established, has drawbacks related to both expense and cloud compatibility.

There are also a limited number of known methods for performing computation on ciphertext, such as homomorphic encryption, but none is able to modify the way in which the ciphertext is encrypted. Furthermore, performing computation on ciphertext using known methods, such as homomorphic encryption, is highly computationally demanding and expensive, and therefore requires significant time and processing resources.

SUMMARY

In one aspect of the invention, there is provided a computer-implemented method for processing a first ciphertext, wherein the first ciphertext is data encrypted with a first key and not encrypted with a second key, the method comprising: receiving a swap key, wherein the swap key is the product of an exclusive OR operation performed on the first key and the second key; receiving the first ciphertext; and performing an exclusive OR operation on the swap key and the first ciphertext to produce second ciphertext, such that the second ciphertext is the data encrypted with the second key and not encrypted with the first key. The method may be suitable for use and implementation with symmetric encryption processes and systems. Moreover, the first and the second key may be symmetric encryption keys. Furthermore, the swap key, being the product of an XOR operation performed on the first and second keys, may be a symmetric encryption key.

In this way, the method allows encrypted data to be processed, and for the encryption properties to be changed, without incurring significant computational and time costs and without the plaintext appearing in clear. This is achieved by innovative use of the properties of the exclusive OR logic function (XOR).

The first ciphertext is data which has previously been encrypted with a first key, and which is not currently encrypted with a second key. It will be understood that encryption of the data with the first key to produce the first ciphertext can form part of the disclosed method; however this need not be a requirement of the invention per se. It will be appreciated that encryption of the data with the first key to produce the first ciphertext may not form part of the method itself, rather the first ciphertext has been encrypted with the first key before it is received.

Whilst performing an XOR function on encryption keys is generally known in the art, it has only been used typically to generate further encryption keys with which to encrypt plaintext or to enable key sharing. DE102008042406A1, for example, describes that the benefit of using an XOR function on two encryption keys is the generation of a third encryption key with minimal computing power. The third encryption key is then used to encrypt plaintext, so the resulting ciphertext is simply encrypted with the third encryption key. This is merely a method for generating keys and does not allow ciphertext to be modified, and accordingly has never provided a solution to the problem addressed by the present invention.

In the context of key sharing, it has also been known to apply an XOR operation to parts, or halves, of encryption keys. By splitting a key into two or more parts, the key can be stored securely in multiple locations and only generated in its complete form when required. The complete encryption key is then used as a standard encryption key, i.e. to encrypt plaintext. The parts of the key are not themselves used to encrypt plaintext. Some publications, for example US2017/272243A1, refer to the key halves as 'keys'; however these 'keys' are never used alone to encrypt plaintext or decrypt ciphertext and should also therefore be considered to be key halves. Whilst this is a known method for sharing a key, it cannot modify ciphertext, and thus additionally has never provided a solution to the problem addressed by the present invention.

The aforementioned known methods involving an XOR function are unable to modify ciphertext in order to change the properties of the encryption. In particular, irrespective of how many keys are contemplated and how the keys are generated, no known method has ever employed encryption keys in combination with ciphertext for anything other than eventual decryption to plaintext. In other words, once ciphertext has been generated by known encryption methods, the next step typically performed on the ciphertext itself (in relation to the encryption) is one of decryption of the ciphertext using the same key that encrypted it.

The present invention utilises an XOR function applied to two encryption keys to process encrypted data, and by doing so changes the encryption properties, whilst ensuring that the plaintext is still retrievable. The present invention can change the encryption format, which is advantageous, for example: to keep up with changes in data security standards, keep up with advances in encryption breaking technology including quantum based algorithms, transfer encrypted data from one storage location to another, or simply to renew the crypto period, or operational life, of an encryption key.

Processing the encrypted data may be achieved using a block cipher. A block cipher is advantageous because it ensures that identical input blocks do not form identical encrypted blocks, which could compromise the security of the algorithm. This is achieved by changing the encryption for each block, for example by implementing a counter or by incorporating the previous block into the encryption of the next block. In this way, a block cipher may be considered to act as a stream cipher.

Block ciphers which are capable of acting as stream ciphers include any cryptographic mode of operation which allows a cryptographic block cipher to act as a binary additive stream cipher. Such cryptographic modes of operation include, but are not limited to: counter mode, Galois/counter mode, output feedback mode, and cipher feedback mode.

Processing the encrypted data in a counter mode of operation may comprise: for a first block of the first ciphertext, concatenating a first initialisation vector and a first counter value to produce a first concatenated vector; concatenating a second initialisation vector and the first counter value to produce a second concatenated vector; producing first encryption data by encrypting the first concatenated vector with the first key; producing second encryption data by encrypting the second concatenated vector with the second key; and performing an exclusive OR operation on the first and second encryption data to produce a first swap key, and wherein performing an exclusive OR operation on the swap key and the first ciphertext is performed on the first swap key and the first block of the first ciphertext to produce a first block of the second ciphertext.

Processing the encrypted data in a counter mode of operation, wherein the first ciphertext comprises n blocks, for each of the second to nth blocks of the first ciphertext may additionally comprise: incrementing the counter value; and repeating the counter mode operation performed on the previous block using the incremented counter value.

In this way, the method can process blocks of ciphertext in parallel with one another, thereby advantageously reducing the time required to perform the method. This is possible because the processing performed on each block of ciphertext is not dependent on the result of processing performed on any other block of ciphertext. While a certain block of ciphertext is being processed, the counter can be incremented and processing can begin on the next block.

Processing the encrypted data in a Galois/counter mode operation may comprise: receiving a first authentication tag associated with the first ciphertext; receiving a second authentication tag associated with the second ciphertext; computing a third authentication tag using a Galois message authentication code function with the first ciphertext as the key; computing a fourth authentication tag using a Galois message authentication code function with the second ciphertext as the key; comparing the first and third authentication tags; and comparing the second and fourth authentication tags.

In this way, the method can authenticate the first ciphertext to ensure that the first ciphertext has not been changed since its original encryption, and generate an authentication tag with which the second ciphertext can be authenticated in the future. The method provides authenticated encryption and enables future authenticated encryption. A Galois/counter mode of operation may also be able to benefit from increased efficiency and performance because the swap function and authentication can be operated in parallel, thereby advantageously reducing the time taken to perform the method.

Computing the third authentication tag may additionally comprise: performing Galois field multiplication on first authentication data to produce a first authentication stream; performing an exclusive OR operation on the first authentication stream and the first block of the first ciphertext; performing Galois field multiplication on the product of step ii; repeating steps ii and iii for every block of the first ciphertext; performing Galois field multiplication on the product of step iv; performing an exclusive or operation on the product of step v and a first length authentication vector, wherein the length authentication vector is a length of the first authentication data concatenated with a length of the first ciphertext; performing Galois field multiplication on the product of step vi; and performing an exclusive or operation on the product of step vii and the first encryption data.

Computing the fourth authentication tag may additionally comprise: performing the method used to produce the third authentication tag on second authentication data, the second ciphertext, a second length authentication vector, and the second encryption data, wherein the second length authentication vector is a length of the second authentication data concatenated with a length of the second ciphertext.

Processing the encrypted data in a cipher feedback mode may comprise: encrypting a first initialisation vector with the first key to produce first encryption data; encrypting a second initialisation vector with the second key to produce second encryption data; and performing an exclusive OR operation on the first and second encryption data to produce a first swap key, and wherein performing an exclusive OR operation on the swap key and the first ciphertext is performed on the first swap key and the first block of the first ciphertext to produce a first block of the second ciphertext.

The first ciphertext may comprise n blocks and the second ciphertext may comprise n blocks, and for the nth block of the first ciphertext, processing the encrypted data in a cipher feedback mode may additionally comprise: encrypting the (n−1)th block of the first ciphertext; encrypting the (n−1)th block of the second ciphertext; and performing an exclusive OR operation on the product of step i and the product of step ii to produce an nth swap key, and wherein performing an exclusive OR operation on the swap key and the first ciphertext is performed on the nth swap key and the nth block of the first ciphertext to produce an nth block of the second ciphertext.

In this way, the method provides a self-synchronising stream cipher. A self-synchronising stream cipher can be advantageous because a party receiving the output of the cipher automatically synchronises with the keystream generator, providing confidentiality and limiting error propagation. Automatic synchronisation means that the cipher recovers effectively if bits are added to, or dropped from, the input to the cipher. Not only is this advantageous because a more complete output is produced than with other ciphers, but can be more secure if bits are deliberately added or dropped, since cryptanalysis is made harder.

Processing the encrypted data in an output feedback mode may comprise: encrypting a first initialisation vector with the first key to produce first encryption data; encrypting a second initialisation vector with the second key to produce second encryption data; and performing an exclusive OR operation on the first and second encryption data to produce a first swap key, and wherein performing an exclusive OR operation on the swap key and the first ciphertext is performed on the first swap key and the first block of the first ciphertext to produce a first block of the second ciphertext.

The first ciphertext may comprise n blocks and the second ciphertext may comprise n blocks, and wherein for the second block of the first ciphertext, processing the encrypted data in an output feedback mode may additionally comprise: encrypting the first encryption data to produce second block first encryption data; encrypting the second encryption data to produce second block second encryption data; and performing an exclusive OR operation on the second block first encryption data and the second block first encryption data to produce a second swap key, and wherein performing an exclusive OR operation on the swap key and the first ciphertext is performed on the second swap key and the second block of the first ciphertext to produce an second block of the second ciphertext.

For the nth block of the first ciphertext, processing the encrypted data in an output feedback mode may further comprise: encrypting the (n−1)th block first encryption data to produce nth block first encryption data; encrypting the (n−1)th block second encryption data produce nth block second encryption data; and performing an exclusive OR operation on the nth block first encryption data and the nth block second encryption data to produce an nth swap key, and wherein performing an exclusive OR operation on the swap key and the first ciphertext is performed on the nth swap key and the nth block of the first ciphertext to produce an nth block of the second ciphertext.

In this way, the method provides a synchronous stream cipher. A synchronous stream cipher can be advantageous because the production of the keystream, also referred to herein as the encryption data, is not dependent on the completion of processing performed on any block of ciphertext. Blocks of ciphertext may therefore be processed in parallel with one another, advantageously reducing the time taken to perform the method.

When processing the encrypted data in a counter or Galois/counter mode of operation, encryption of the first concatenated vector may be performed using the same encryption algorithm as encryption of the second concatenated vector. Alternatively, encryption of the first concatenated vector may be performed using a different encryption algorithm to encryption of the second concatenated vector.

When processing the encrypted data in a cipher or output feedback mode of operation, encryption of the first initialisation vector may be performed using the same encryption algorithm as encryption of the second initialisation vector. Alternatively, encryption of the first initialisation vector may be performed using a different encryption algorithm to encryption of the second initialisation vector.

When processing the encrypted data in any mode of operation, the method may use a first key and a second key of different lengths. Alternatively, the method may use a first key and a second key that are the same length.

In this way, it is possible for the method to take ciphertext originally encrypted using a certain algorithm, and output ciphertext encrypted using a new algorithm without the plaintext ever appearing in clear. This may be advantageous if, for example, the algorithm with which certain data is secured becomes less secure due to advances in a relevant encryption breaking field.

One example of an algorithm, or type of algorithm, which may become less secure in the future is the popular asymmetric Rivest-Shamir-Adleman (RSA) algorithm, based on one public and one private key. The public key is the product of two large prime numbers and the only way to break the encryption is to find the prime factors of the key. RSA's security is to therefore reliant on the difficulty faced by conventional computers performing prime factorisation. Quantum computers are not so limited and, using Shor's algorithm, may be able to break RSA encryption in an amount of time many orders of magnitude smaller than the time required by conventional computers. RSA could, therefore, become essentially obsolete once a certain level of quantum computing is achieved.

Symmetric encryption may offer security for asymmetrically encrypted data compromised by advances in quantum computing. The present invention could be used to take data encrypted using RSA and output that same data encrypted under a more secure algorithm. In the specific example of quantum computing advances, a more secure algorithm may be a symmetric algorithm such as AES, for example, for which advances in quantum computing have only a twofold speed impact according to Grover's algorithm. The present invention could also be used to increase the length of the key under which data is encrypted, which would also provide additional security by increasing the time required to break the encryption.

As the number and content of secure datasets grow ever larger, so does the task of regularly updating the encryption of the datasets in order to stay ahead of advances in encryption breaking. The present invention, by being both computationally efficient and independent of expensive secure hardware, could perform this task avoiding the prohibitive computing and hardware expenses that would be inevitable with known methods.

In one embodiment, the data encrypted with the first key is plaintext data which has been encrypted with the first key, and not encrypted with the second key. In another embodiment, the data encrypted with the second key is plaintext data which is encrypted with the second key, and not encrypted with the first key.

The method may be implemented on a data processing apparatus, a computer program comprising instructions which, when the program is executed by a computer, cause the computer to carry out the steps of the aforementioned method, and/or a computer-readable storage medium comprising instructions which, when executed by a computer, cause the computer to carry out the steps of the method.

BRIEF DESCRIPTION OF THE DRAWINGS

FIG. 1 illustrates a known system for processing data. Embodiments of the invention will be described below, by way of example, with reference to the following drawings, in which:

FIG. 4 illustrates a Counter-Mode (CTR) cipher performing a key swap algorithm according to an embodiment of the present invention.

FIG. 7 illustrates an Output-Feedback (OFB) cipher performing a key swap algorithm according to an embodiment of the present invention.

DETAILED DESCRIPTION

The invention is described below with reference to a number of different embodiments and the aforementioned drawings. These embodiments are merely illustrative and are not intended to limit the scope of the appended claims.

Figure 1:
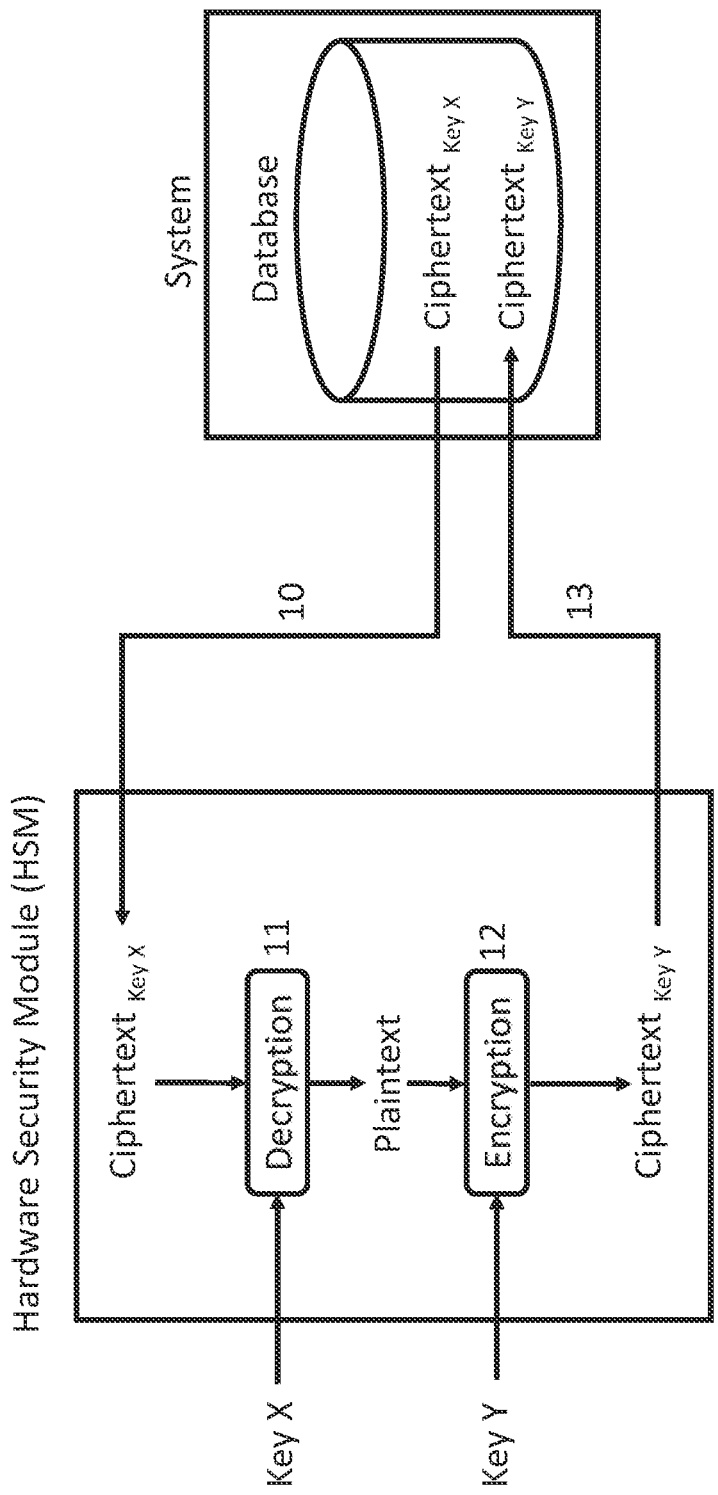
Figure 2:
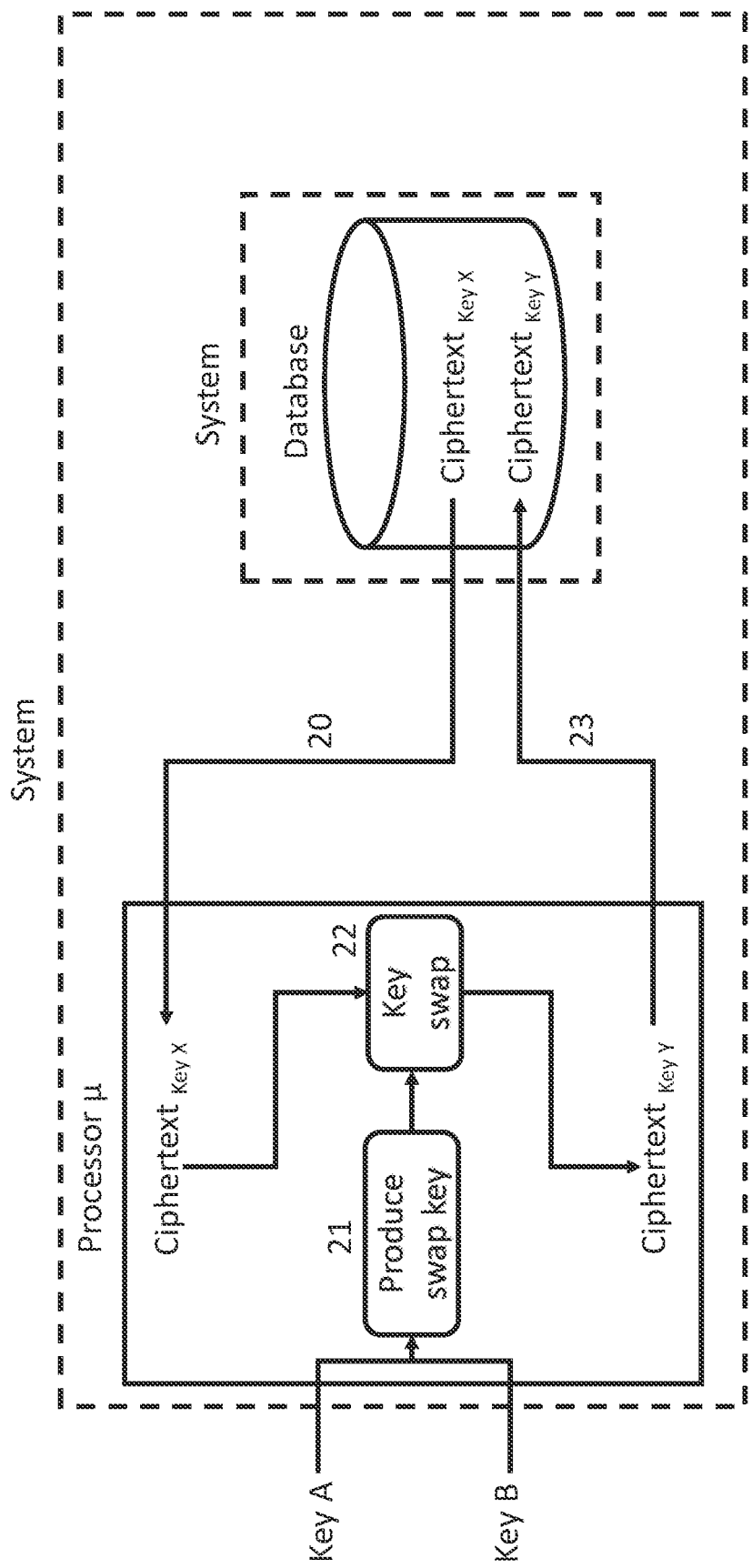
FIG. 2 illustrates a system for processing data according to the present invention.

Referring to FIG. 2, there is disclosed a system suitably configured for performing the method of the present invention. It will be appreciated that the system may comprise a database and a processor, and that the transmissions of the ciphertexts may be internal. Alternatively, there may be a plurality of systems, one comprising the database, another the processor, and that the transmissions of the ciphertexts may be between remote systems.

In a first step 20, ciphertext encrypted under Key X may be transmitted to a processor μ. In a second step, the processor μ may receive Key A and Key B. It will be appreciated that neither, one, nor both of Key A and Key B can be received externally from outside of the system, via wireless or wired transmission. It will also be appreciated that neither, one, nor both of Key A and Key B can be stored at the system and transmitted to the processor μ internally.

In a second step 21, the processor μ produces a swap key according to the method of the present invention, and in a third step 22 applies the swap key to the ciphertext encrypted under Key X according to the method of the present invention. The product of the key swap algorithm 22 is ciphertext encrypted under Key Y, and no longer encrypted under Key X. The ciphertext encrypted under Key Y may be transmitted back to the database.

The terminology "swap key", as used herein, refers to an encryption key having properties which allow it to be used to change the encryption key with which data is encrypted. This is achieved, according to the invention, when the swap key and ciphertext (which is encrypted with a first key) are both inputs to an exclusive-OR (XOR) operation; this outputs a ciphertext which is encrypted with a second key and which is no longer encrypted with the first key. In other words, the key with which the ciphertext is encrypted has been "swapped". In accordance with embodiments of the invention, a swap key having such properties may be produced by performing an XOR operation on the first and second keys. The swap key can thus be utilised on ciphertext to transform the encryption key utilised with the ciphertext, without the underlying data itself being seen in clear, and without the underlying first and second encryption keys being accessible.

The key swap algorithms shown in FIGS. 3 to 7 may be implemented in a key swap block implemented in a computer processor, a data processing apparatus, a computer program comprising instructions, and/or a computer-readable storage medium.

It will be appreciated that the ciphertext encrypted under Key Y may be transmitted back to the same database in which the ciphertext encrypted under Key X was stored. Additionally, or alternatively, the ciphertext encrypted under Key Y may be transmitted to any other system, for example a remote system comprising a database onto which the encrypted data is to be migrated.

The key swap algorithm at step 22 does not, at any stage, produce plaintext. For this reason, the processor μ may be a standard processing unit without sacrificing the security of the data. The invention is not so limited, however, and the processor μ may be a hardware security module (HSM).

XOR

Figures 3A, 3B:
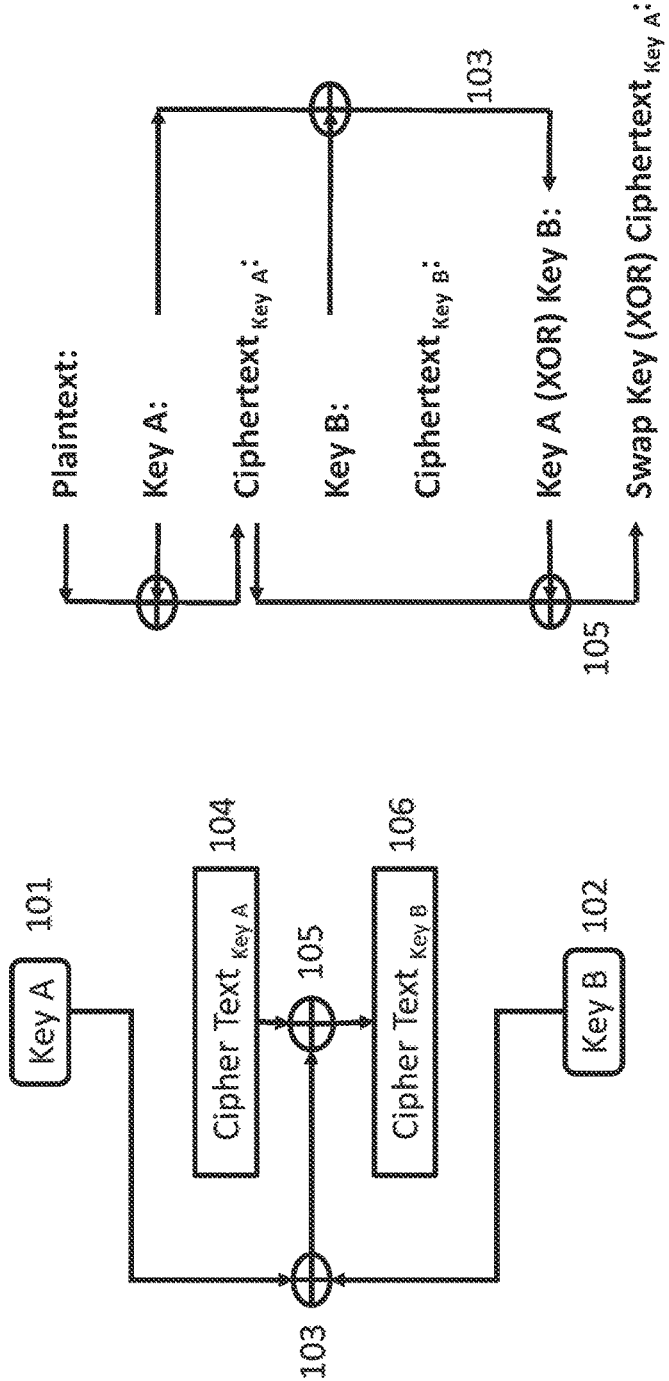
FIG. 3A illustrates a method for processing encrypted data according to an embodiment of the present invention.
FIG. 3B illustrates an exemplary embodiment of the method shown in FIG. 3A.

Referring to FIG. 3A, there is a method for processing encrypted data according to an embodiment of the present invention. In particular, FIG. 3A shows a method for taking ciphertext encrypted under a first encryption key and producing ciphertext encrypted under a second encryption key.

The first encryption key may be referred to as Key A, and vice versa. The second encryption key may be referred to as Key B, and vice versa.

Ciphertext encrypted under Key A may be referred to as ciphertext key A and/or first ciphertext. Ciphertext encrypted under Key B may be referred to as ciphertext key B and/or second ciphertext.

An exclusive-OR operation (XOR operation) 103 is performed on Key A 101 and Key B 102. The result of the XOR operation 103 may be referred to as a swap key.

A XOR operation 105 is performed on ciphertext 104 encrypted under Key A and the swap key. The result of the XOR operation 105 is ciphertext 106 encrypted under Key B.

By way of example, FIG. 3B demonstrates the functionality of the XOR operation utilised by embodiments of the invention.

As an example, plaintext has been assigned the exemplary value of 0100101100, Key A has been assigned the exemplary value of 0010010101, and Key B has been assigned the exemplary value of 1011010000. Performing an XOR operation on the plaintext and Key A produces ciphertext encrypted under Key A, 0110111001. Encryption of the plaintext under Key A may be indicative of an original encryption step for sensitive data (the plaintext), wherein the ciphertext encrypted under Key A can then be stored for later retrieval and use.

Performing an XOR operation on Key A and Key B produces 1001000101, which is then referred to as a "swap key".

Performing an XOR operation on the swap key and the ciphertext encrypted under Key A produces 1111111100. This step may be indicative of a need to update the encryption of the plaintext, for example to update to a new key in order to comply with data security standards.

The result of an XOR operation between the original plaintext and Key B can then be calculated, and produces 1111111100. This matches the result of the XOR operation on the swap key and ciphertext encrypted under Key A. Thus, by way of the aforementioned process, the swap key is capable of modifying ciphertext encrypted under Key A such that it is encrypted under Key B, and not under Key A.

In this way, the method is able to take ciphertext encrypted under a certain key, in this case Key A, and modify it such that it is now encrypted under a different key, in this case Key B. In effect, the method is able to perform decryption from one key and encryption under another key in a single operation without the underlying plaintext data being accessible or viewable at any stage in the process. Achieving this functionality with an XOR operation on the two keys, followed by an XOR operation on the swap key and the original ciphertext, is computationally efficient and ensures that the plaintext never appears in clear. In other words, the key swap operation does not need to be performed securely, for example within a hardware security module (HSM), because an attacker will not have the opportunity to view the plaintext.

The example shown in FIG. 3B is in no way limiting on the scope of the invention. It will be appreciated that the method of the present invention may function with any plaintext, any encryption key, an encryption key of any length, certain additional logical operations at any stage of the method, and any other variations that a person skilled in the art would understand not to interfere with the method. In particular, the methods of the present invention are not limited to performing an XOR operation directly on encryption keys, but also include performing an XOR operation on the product of an encryption using an encryption key, for example an encrypted initialisation vector.

Counter Mode (CTR)

In an embodiment of the present invention, the cipher used to perform the modification of the encrypted data is a counter mode block cipher (CTR).

Referring to FIG. 4, there is a method 200 of processing encrypted data according to an embodiment of the present invention. The method 200 may be referred to as a CTR swap function.

Ciphertext which has previously been encrypted under Key A is partitioned into blocks 204, 214, and 224. It will be appreciated that the ciphertext may be partitioned into any number of blocks and that the depiction of three blocks in FIG. 4 is not limiting.

In some embodiments, the length of the blocks of ciphertext encrypted under Key A is equal to the lengths of the results of encryptions 209 and 210, such that the XOR operations 203 and 205 are performed on data strings of equal length.

Two initialisation vectors are generated, one initialisation vector, referred to herein as the first initialisation vector, ($IV_A$) to be encrypted under Key A 201 and one initialisation vector, referred to herein as the second initialisation vector, ($IV_B$) to be encrypted under Key B 202. In some embodiments, the initialisation vectors are randomly generated numbers. For a first block of the ciphertext, a counter value is added to the initialisation vectors 207 and 208. In some embodiments, the counter value for the first block of the ciphertext may be zero. The counter value for the first block of the ciphertext is concatenated with the first initialisation vector to produce a first concatenated vector 207 and the counter value for the first block of the ciphertext is concatenated with the second initialisation vector to produce a second concatenated vector 208. Concatenation is shown in the figures by the following notation: '||', and may be defined as adding the counter value to the end of the initialisation vector.

The first concatenated vector 207 is encrypted at 209 under Key A 201 to produce first encryption data for the first block. The second concatenated vector 208 is encrypted at 210 under Key B 202 to produce second encryption data for the first block. Encryption may be performed with any known block cipher including, but not limited to: AES, Blowfish, DES, Triple DES, Serpent, and Twofish. The length(s) of the block(s) of ciphertext encrypted under Key A, and therefore the length(s) of the block(s) of ciphertext encrypted under Key B generated by the method, may be configured for use with the block cipher used to perform the encryption. For example, when AES is used to encrypt at 209, the ciphertext encrypted under Key A may be partitioned into 128 bit blocks.

An XOR operation 203 is performed on the (first block) first and second encryption data to produce a first swap key. The first swap key produced in this way has similar beneficial properties to the swap key described in relation to FIG. 3, in that it is able to modify the first block of the ciphertext encrypted under Key A such that it is encrypted under Key B and not under Key A in a single operation.

An XOR operation 205 is then performed on the first swap key and the first block 204 of the ciphertext encrypted under Key A to produce a first block 206 of the ciphertext encrypted under Key B. Ciphertext, or blocks thereof, encrypted with Key A may be referred to as first ciphertext. Ciphertext, or blocks thereof, encrypted with Key B may be referred to as second ciphertext.

The counter value is then incremented 211 and the new counter value concatenated with both the first initialisation vector and the second initialisation vector to produce updated first and second concatenated vectors 217 and 218. The incrementation may be any magnitude that is not zero, because in order to benefit from the advantages of a stream cipher, the updated first and second concatenated vectors 217 and 218 must be different to the first and second concatenated vectors 207 and 208.

The method described in relation to the first and second initialisation vectors and first block 204 of the ciphertext encrypted under Key A is then performed using the updated initialisation vectors and the second block 214 of the ciphertext encrypted under Key A.

The updated first concatenated vector 217 is encrypted at 219 under Key A 201 to produce first encryption data for the second block. The updated second concatenated vector 218 is encrypted at 220 under Key B 202 to produce second encryption data for the second block. Although the concatenated vectors have been updated, the keys and the encryption algorithms used to encrypt the initialisation vectors may remain the same as those used in relation to the first block 204 of the ciphertext.

An XOR operation 213 is performed on the (second block) first and second encryption data to produce an updated first swap key.

An XOR operation 215 is then performed on the updated first swap key and the second block 214 of the ciphertext encrypted under Key A to produce a second block 216 of the ciphertext encrypted under Key B.

Optionally, the first and second blocks of the ciphertext encrypted under Key B may be concatenated in order to be further manipulated or stored.

The incrementation step, concatenation steps, encryption steps, and XOR operations are then repeated for each block of the ciphertext encrypted under Key A until, for n blocks of ciphertext, the steps have been performed on the nth block 224 of the ciphertext encrypted under Key A to produce the nth block 226 of the ciphertext encrypted under Key B. The entirety of the ciphertext originally encrypted under Key A is now encrypted under Key B.

Optionally, the blocks of the ciphertext encrypted under Key B may then be concatenated in order to be further manipulated or stored.

GCM

In an embodiment of the invention, the cipher used to perform the modification of the encrypted data is a Galois/Counter Mode block cipher.

Figure 5:
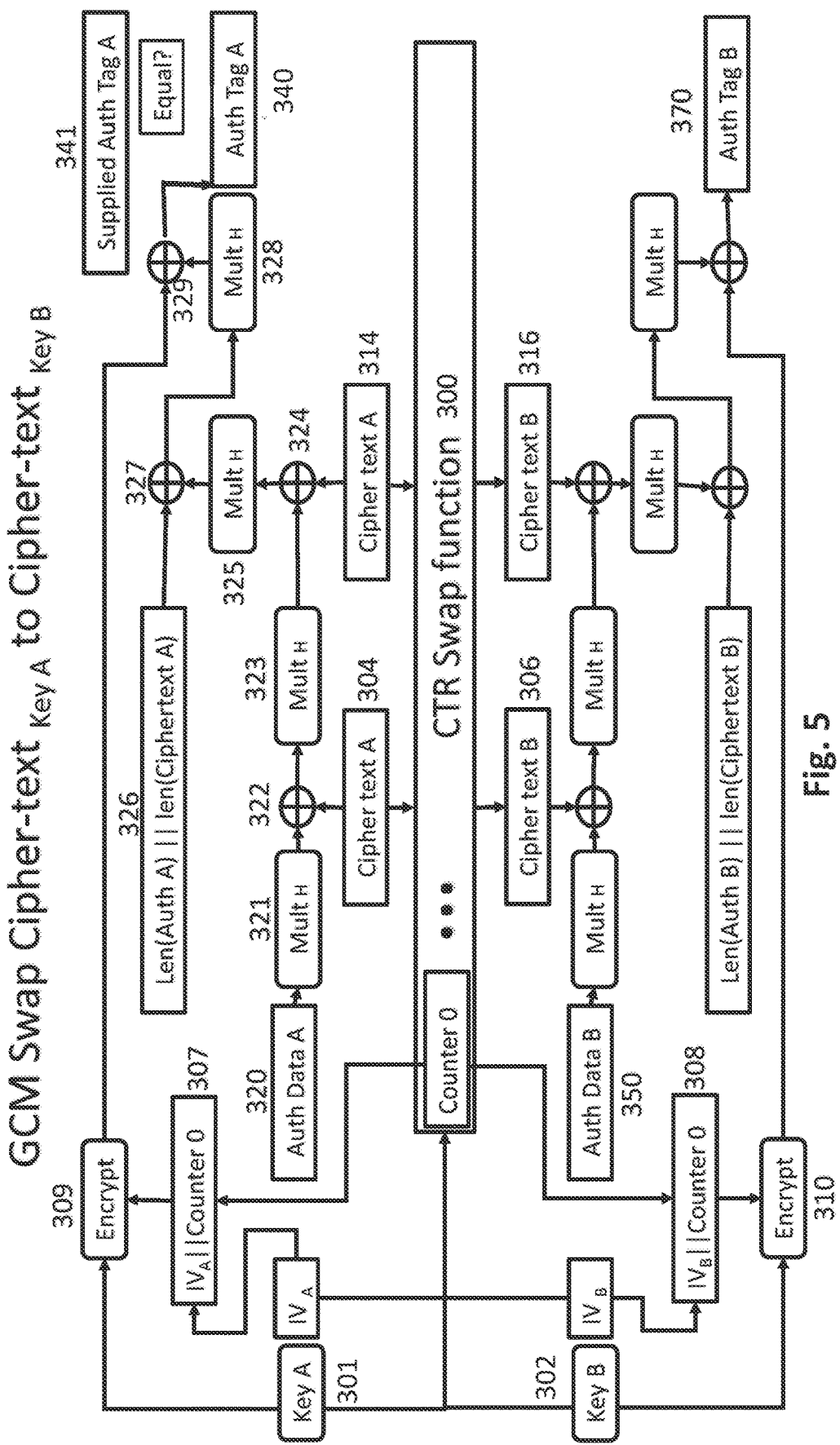
FIG. 5 illustrates a Galois/Counter-Mode (GCM) cipher performing a key swap algorithm according to an embodiment of the present invention.

Referring to FIG. 5, there is a method of processing encrypted data according to an embodiment of the present invention.

The method is based on the counter-mode (CTR) swap function 200 shown in FIG. 4. FIG. 5 shows two blocks of ciphertext 304 and 314 encrypted under Key A, however, it will be appreciated that the method can be performed on any number of blocks of ciphertext, for example three blocks of ciphertext as depicted in FIG. 4.

The method incorporates the CTR swap function 300 into a Galois mode of authentication. In this way, and as previously detailed, the method provides authentication and encryption (authenticated encryption) in one method and can benefit from increased processing efficiency due to the ability to apply parallel processing.

The blocks of ciphertext 304 and 314 encrypted under Key A are fed as inputs to the CTR swap function 300, so may be considered to be equivalent to blocks of ciphertext 204 and 214 in FIG. 4. Key A 301 and Key B 302 are also fed as inputs to the CTR swap function 300, so may be considered to be equivalent to Key A 201 and Key B 202. Two initialisation vectors are generated, one initialisation vector, referred to herein as the first initialisation vector, ($IV_A$) to be encrypted under Key A 301 and one initialisation vector, referred to herein as the second initialisation vector, ($IV_B$) to be encrypted under Key B 302. The two initialisation vectors $IV_A$ and $IV_B$ are fed as inputs to the CTR swap function 300, so may be considered to be equivalent to the initialisation vectors described in relation to CTR swap function 200. The CTR swap function 300 operates in the same manner as described in relation to CTR swap function 200 to produce blocks of ciphertext 306 and 316 encrypted under Key B.

First authentication data 320 (Auth Data A), the blocks of ciphertext 304 and 314 encrypted under Key A, the length of the first authentication data, and the length of the entire ciphertext encrypted under Key A are used in a Galois authentication method to generate a first authentication tag 340 (Auth Tag A). A supplied authentication tag 341 (Supplied Auth Tag A) can then be compared to the generated first authentication tag 340 to authenticate the ciphertext encrypted under Key A.

The Galois authentication method may operate as follows. Galois field multiplication (Mutt H) is performed on the first authentication data 320 at step 321, and a XOR operation 322 is then performed on the result of step 321 and the first block 304 of the ciphertext encrypted under Key A. The result of XOR operation 322 may be referred to as the start of a first authentication stream. Galois field multiplication is then performed on the result of XOR operation 322 at step 323 to continue the first authentication stream. A XOR operation 324 is then performed on the result of step 323 and the second block 314 of the ciphertext encrypted under Key A. For each block of the ciphertext encrypted under Key A, Galois field multiplication is performed on the authentication stream, and then a XOR operation is performed on the result of the Galois field multiplication and the next block of the ciphertext encrypted under Key A. This process repeats until the final block of the ciphertext encrypted under Key A has been incorporated, via a XOR operation, into the authentication stream. In FIG. 5, this is after Galois field multiplication at step 325.

A first length authentication vector 326 is generated by calculating the length of the first authentication data 320 and the length of the ciphertext encrypted under Key A. The length of the first authentication data and the length of the ciphertext encrypted under Key A are then concatenated to produce the first length authentication vector 326. At step 327, a XOR operation is performed on the final Galois field multiplication 325 of the authentication stream and the length authentication vector 326. Galois field multiplication 328 is then performed on the result of the XOR operation 327.

The first initialisation vector $IV_A$ is concatenated with the first counter value to produce a first concatenated vector 307, which is then encrypted with Key A 301 at step 309. A XOR operation 329 is performed on the product of encryption 309 and the product of Galois field multiplication 328 to generate the first authentication tag 340. If the generated first authentication tag 340 is identical to the supplied authentication tag 341, which was produced when the ciphertext was initially encrypted under Key A, then the ciphertext encrypted under Key A that has been used for the CTR swap function has been authenticated. In other words, it is confirmed that the ciphertext encrypted under Key A has not been modified since its original encryption under Key A. In this way, it is also confirmed that the ciphertext encrypted under Key A has been sent by an authentic sender. This is particularly advantageous for the present method because the plaintext never appears in clear, so there cannot be an authentication step based on the plaintext.

Second authentication data 321 (Auth Data B), the blocks of ciphertext 306 and 316 encrypted under Key B, the length of the second authentication data, and the length of the entire ciphertext encrypted under Key B are used to generate a second authentication tag 370 (Auth Tag B). The process by which the second authentication tag 370 is generated may be the same as that used to generate the first authentication tag 340, but using the second authentication data 350 and the ciphertext encrypted under Key B.

An authentication tag may also be referred to as a message authentication code (MAC). An authentication tag or MAC provides message authentication because it is generated using the initialisation vector, the secret key, the authentication data, and the length of the ciphertext, so cannot be forged by a third party who does not possess all of those pieces of information, including the secret key.

CFB

In an embodiment of the present invention, the cipher used to perform the modification of the encrypted data is a cipher feedback mode block cipher.

Figure 6:
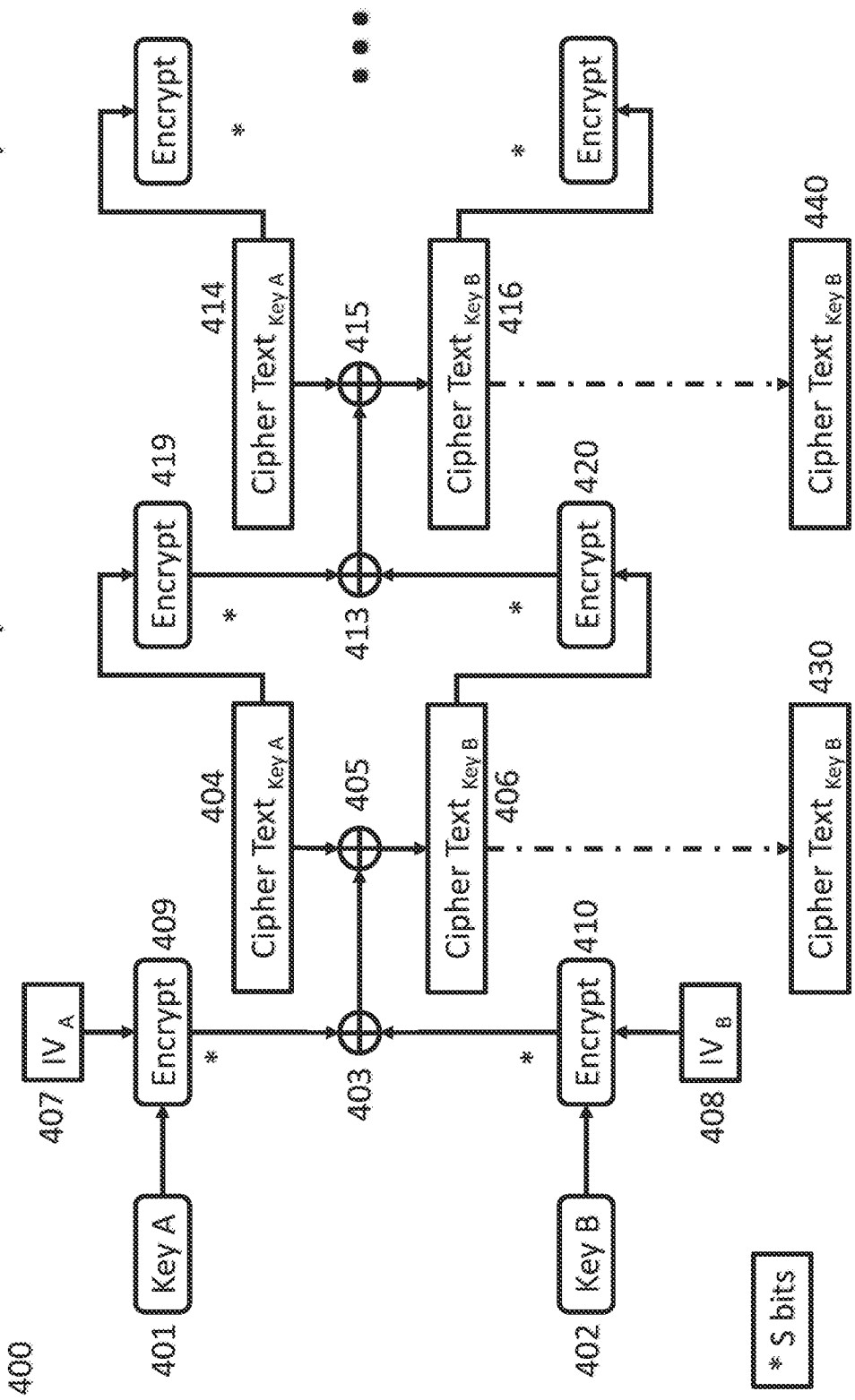
FIG. 6 illustrates a Cipher-Feedback (CFB) cipher performing a key swap algorithm according to an embodiment of the present invention.

Referring to FIG. 6, there is a method 400 of processing encrypted data according to an embodiment of the present invention. The method 400 may be referred to as a CFB swap function.

Ciphertext which has previously been encrypted under Key A is partitioned into blocks 404 and 414. It will be appreciated that the ciphertext may be partitioned into any number of blocks and that the depiction of two blocks in FIG. 6 is not limiting.

In some embodiments, the length of the blocks of ciphertext encrypted under Key A is equal to the length of the result of encryption 409 and 410, such that the XOR operations 403 and 405 are performed on data strings of equal length.

Two initialisation vectors are generated, one initialisation vector, referred to herein as the first initialisation vector 407, ($IV_A$) to be encrypted under Key A 401 and one initialisation vector, referred to herein as the second initialisation vector 408, ($IV_B$) to be encrypted under Key B 402. In some embodiments, the initialisation vectors are randomly generated numbers.

The first initialisation vector 407 is encrypted at 409 under Key A 401 to produce first encryption data for the first block. The second initialisation vector 408 is encrypted at 410 under Key B 402 to produce second encryption data for the first block. Encryption may be performed with any known algorithm(s) including, but not limited to, algorithms listed above in relation to the CTR swap function illustrated in FIG. 4.

An XOR operation 403 is performed on the (first block) first and second encryption data to produce a first swap key. The first swap key produced in this way has similar beneficial properties to the swap key described in relation to FIG. 3, in that it is able to modify the first block of the ciphertext encrypted under Key A such that it is encrypted under Key B and not under Key A in a single operation.

An XOR operation 405 is then performed on the first swap key and the first block 404 of the ciphertext encrypted under Key A to produce a first block 406 of the ciphertext encrypted under Key B. Ciphertext, or blocks thereof, encrypted with Key A may be referred to as first ciphertext. Ciphertext, or blocks thereof, encrypted with Key B may be referred to as second ciphertext.

A copy 430 of the first block 406 of the ciphertext encrypted under Key B may be output by the method, or stored, for later concatenation with additional blocks of ciphertext encrypted under Key B.

The first block 404 of the ciphertext encrypted under Key A is then encrypted 419 to produce first encryption data for the second block, and the first block 406 of the ciphertext encrypted under Key B is encrypted 420 to produce second encryption data for the second block. [The encryption algorithm(s) 419/420 used at this stage may be/may not be the same as the encryption algorithm(s) 409/410 used to encrypt the initialisation vectors.]

An XOR operation 413 is performed on the (second block) first and second encryption data to produce an updated first swap key.

An XOR operation 415 is then performed on the updated first swap key and the second block 414 of the ciphertext encrypted under Key A to produce a second block 416 of the ciphertext encrypted under Key B. A copy 440 of the second block 416 of the ciphertext encrypted under Key B may be output by the method, or stored, for later concatenation with earlier and/or additional blocks of ciphertext encrypted under Key B. For example, in one embodiment of the invention where the ciphertext encrypted under Key A has been split into two blocks, such that two blocks of ciphertext encrypted under Key B are generated, the copies of the two blocks of ciphertext encrypted under Key B may be concatenated and stored together.

The encryption of the previous block of ciphertext, for both ciphertext encrypted under Key A and under Key B, and the XOR operations are then repeated for each block of the ciphertext encrypted under Key A until, for n blocks of ciphertext, the steps have been performed on the nth block of the ciphertext encrypted under Key A to produce the nth block of the ciphertext encrypted under Key B. The entirety of the ciphertext originally encrypted under Key A is now encrypted under Key B.

The CFB swap function may be described as further encrypting the most recent block of the first and second ciphertext, and performing an XOR operation on the generated encryption data in order to produce an updated swap key.

OFB

In an embodiment of the present invention, the cipher used to perform the modification of the encrypted data is an output feedback mode block cipher.

Referring to FIG. 7, there is a method 500 of processing encrypted data according to an embodiment of the present invention. The method 500 may be referred to as a OFB swap function.

Ciphertext which has previously been encrypted under Key A is partitioned into blocks 504 and 514. It will be appreciated that the ciphertext may be partitioned into any number of blocks and that the depiction of two blocks in FIG. 7 is not limiting.

In some embodiments, the length of the blocks of ciphertext encrypted under Key A is equal to the length of the result of encryption 509 and 510, such that the XOR operations 503 and 505 are performed on data strings of equal length.

Two initialisation vectors are generated, one initialisation vector, referred to herein as the first initialisation vector 507, ($IV_A$) to be encrypted under Key A 501 and one initialisation vector, referred to herein as the second initialisation vector 508, ($IV_B$) to be encrypted under Key B 502. In some embodiments, the initialisation vectors are randomly generated numbers.

The first initialisation vector 507 is encrypted at 509 under Key A 501 to produce first encryption data for the first block. The second initialisation vector 508 is encrypted at 510 under Key B 502 to produce second encryption data for the first block. [Encryption can be performed with any known algorithm(s) including, but not limited to, algorithms listed above in relation to the CTR swap function illustrated in FIG. 4.]

An XOR operation 503 is performed on the (first block) first and second encryption data to produce a first swap key. The first swap key produced in this way has similar beneficial properties to the swap key described in relation to FIG. 3, in that it is able to modify the first block of the ciphertext encrypted under Key A such that it is encrypted under Key B and not under Key A in a single operation.

An XOR operation 505 is then performed on the first swap key and the first block 505 of the ciphertext encrypted under Key A to produce a first block 506 of the ciphertext encrypted under Key B. Ciphertext, or blocks thereof, encrypted with Key A may be referred to as first ciphertext. Ciphertext, or blocks thereof, encrypted with Key B may be referred to as second ciphertext.

A copy 530 of the first block 506 of the ciphertext encrypted under Key B may be output by the method, or stored, for later concatenation with additional blocks of ciphertext encrypted under Key B.

The encrypted first initialisation vector, i.e. the product of encryption 509, is then encrypted again 519 to produce first encryption data for the second block, and the encrypted second initialisation vector, i.e. the product of encryption 510, is then encrypted again 520 to produce second encryption data for the second block.

An XOR operation 513 is performed on the (second block) first and second encryption data to produce an updated first swap key.

An XOR operation 515 is then performed on the updated first swap key and the second block 514 of the ciphertext encrypted under Key A to produce a second block 516 of the ciphertext encrypted under Key B. A copy 540 of the second block 516 of the ciphertext encrypted under Key B may be output by the method, or stored, for later concatenation with earlier and/or additional blocks of ciphertext encrypted under Key B. For example, in one embodiment of the invention where the ciphertext encrypted under Key A has been split into two blocks, such that two blocks of ciphertext encrypted under Key B are generated, the copies of the two blocks of ciphertext encrypted under Key B may be concatenated and stored together.

The encryption of the previous encryption data, for both the first and second encryption data, and the XOR operations are then repeated for each block of the ciphertext encrypted under Key A until, for n blocks of ciphertext, the steps have been performed on the nth block of the ciphertext encrypted under Key A to produce the nth block of the ciphertext encrypted under Key B. The entirety of the ciphertext originally encrypted under Key A is now encrypted under Key B.

The OFB swap function may be described as further encrypting the most recent encryption of the first and second encryption data, which originate with the encrypted first and second initialisation vectors, and performing an XOR operation on the generated encryption data in order to produce an updated swap key.

Encryption

Throughout the foregoing description and in the accompanying Figures, 'encryption' and 'encryption algorithm' have been used to describe a mathematical operation, or mathematical operations, used to encode data. Methods of the present invention may be performed with any known block cipher including, but not limited to: AES, Blowfish, DES, Triple DES, Serpent, and Twofish.

Key A and Key B

Throughout the foregoing description and in the accompanying figures, 'Key A' has been used to represent the key under which the ciphertext is encrypted before the method of the present invention is performed, and 'Key B' has been used to represent the key under which the ciphertext is encrypted after the method of the present invention has been performed.

Key A and Key B may be random numbers or may be generated in any way known to generate encryption keys, for example symmetric encryption keys for use in symmetric encryption/decryption. Notably, however, the present invention is not limited to certain types or formats of encryption key. Key A and Key B may be different lengths to one another. Key A and Key B may be the same length as one another. Key B may be longer than Key A; in this way, the method of the present invention improve the security of the encrypted data because there is an association between key length and the length of time required to break the encryption. Key B may be the same length, or shorter, than Key A; in this way the method of the present invention improve the security of the encrypted data because any attempts to break the encryption by determining Key A are rendered useless because the data is no longer encrypted under Key A.

Changing Encryption Algorithm

Methods of the present invention can be used to take ciphertext encrypted using a first encryption algorithm as an input and produce ciphertext encrypted using a second encryption algorithm as an output. This holds true for any combination of first and second encryption algorithms, where the first and second encryption algorithms may be the same encryption algorithm or may be different encryption algorithms. The first and second encryption algorithms may both be symmetric encryption algorithms, may both be asymmetric encryption algorithms, or one may be symmetric and one may be asymmetric.

In some embodiments, the first and second encryption algorithms may be the same. For example, methods of the present invention may be used to take a first ciphertext originally encrypted using AES and output a second ciphertext encrypted using AES, without having to decrypt the ciphertext in order to do so, in other words without the plaintext appearing in clear.

In some embodiments, the first and second encryption algorithms may be different. For example, methods of the present invention may be used to take a first ciphertext originally encrypted using DES and output a second ciphertext encrypted using AES, without having to decrypt the ciphertext in order to do so, in other words without the plaintext appearing in clear.

The encryption data, i.e. the outputs from encryptions 209 and 210, 409 and 410, and 509 and 510, are the same length as each other respectively. In other words, the output from encryption 209 is the same length as the output from encryption 210, the output from encryption 409 is the same length as the output from encryption 410, and the output from encryption 509 is the same length as the output from encryption 510. In embodiments of the invention where the first encryption algorithm is different to the second encryption algorithm, and where the encryption algorithms output encryption data of different lengths, the encryption algorithm producing the shorter encryption data can be run multiple times for each block in order to produce encryption data of the same length as the first ciphertext and of the same length as the encryption data produced by the other encryption algorithm.

In this way, the method can securely change the encryption algorithm under which ciphertext is encrypted without the plaintext appearing in clear.

Changing Key Length

Methods of the present invention can be used to take ciphertext encrypted using a first encryption algorithm as an input and produce ciphertext encrypted using a second encryption algorithm as an output. The key used by the first encryption algorithm may be the same length as the key used by the second encryption algorithm. The key used by the first encryption algorithm may be a different length as the key used by the second encryption algorithm.

Key length does not impact block size so does not impact the length of the encryption data produced by encryptions 209/210/409/410/509/510. For this reason, if the method is being used to change key length, but keep the encryption algorithm the same, the first and second encryption data will be the same length. If the method is being used to change key length and encryption algorithm, and the encryption algorithms produce encryption data of different lengths, the steps described above may be employed to ensure that the first and second encryption data are the same length.

The following are embodiments of the present invention:

1. A computer-implemented method for processing a first ciphertext, wherein the first ciphertext is data encrypted with a first key and not encrypted with a second key, comprising:
   receiving a swap key, wherein the swap key is the product of an exclusive OR operation performed on the first key and the second key;
   receiving the first ciphertext; and
   performing an exclusive OR operation on the swap key and the first ciphertext to produce second ciphertext, such that the second ciphertext is the data encrypted with the second key and not encrypted with the first key.

2. The method according to embodiment 1, wherein the first ciphertext comprises a plurality of blocks and wherein method is implemented using a block cipher.

3. The method according to embodiment 2, wherein a mode of operation of the block cipher is: counter mode; or Galois/counter mode; or output feedback mode; or cipher feedback mode.

4. The method according to embodiment 3, wherein the mode of operation is counter mode, and wherein, for a first block of the first ciphertext, the method further comprises:
   concatenating a first initialisation vector and a first counter value to produce a first concatenated vector;
   concatenating a second initialisation vector and the first counter value to produce a second concatenated vector;
   producing first encryption data by encrypting the first concatenated vector with the first key;
   producing second encryption data by encrypting the second concatenated vector with the second key; and
   performing an exclusive OR operation on the first and second encryption data to produce a first swap key, and wherein performing an exclusive OR operation on the swap key and the first ciphertext is performed on the first swap key and the first block of the first ciphertext to produce a first block of the second ciphertext.

5. The method according to embodiment 4, wherein the first ciphertext comprises n blocks, and wherein for each of the second to nth blocks of the first ciphertext, the method further comprises:
   incrementing the counter value; and
   repeating the method of embodiment 5 using the incremented counter value.

6. The method according to embodiment 4 or embodiment 5, wherein the mode of operation is Galois/counter mode, and wherein the method further comprises:
   receiving a first authentication tag associated with the first ciphertext;
   receiving a second authentication tag associated with the second ciphertext;
   computing a third authentication tag using a Galois message authentication code function with the first ciphertext as the key;
   computing a fourth authentication tag using a Galois message authentication code function with the second ciphertext as the key;
   comparing the first and third authentication tags; and
   comparing the second and fourth authentication tags.

7. The method according to embodiment 6, wherein computing the third authentication tag comprises:
   i) performing Galois field multiplication on first authentication data to produce a first authentication stream;
   ii) performing an exclusive OR operation on the first authentication stream and the first block of the first ciphertext;
   iii) performing Galois field multiplication on the product of step ii;
   iv) repeating steps ii and iii for every block of the first ciphertext;
   v) performing Galois field multiplication on the product of step iv;
   vi) performing an exclusive or operation on the product of step v and a first length authentication vector, wherein the length authentication vector is a length of the first authentication data concatenated with a length of the first ciphertext;
   vii) performing Galois field multiplication on the product of step vi; and
   viii) performing an exclusive or operation on the product of step vii and the first encryption data.

8. The method according to embodiment 6, wherein computing the fourth authentication tag comprises performing the method of embodiment 7 on second authentication data, the second ciphertext, a second length authentication vector, and the second encryption data, wherein the second length authentication vector is a length of the second authentication data concatenated with a length of the second ciphertext.

9. The method according to embodiment 3, wherein for a first block of the first ciphertext, the method further comprises:
   encrypting a first initialisation vector with the first key to produce first encryption data;
   encrypting a second initialisation vector with the second key to produce second encryption data; and
   performing an exclusive OR operation on the first and second encryption data to produce a first swap key, and wherein performing an exclusive OR operation on the to swap key and the first ciphertext is performed on the first swap key and the first block of the first ciphertext to produce a first block of the second ciphertext.

10. The method according to embodiment 9, wherein the mode of operation is cipher feedback mode, wherein the first ciphertext comprises n blocks and wherein the second ciphertext comprises n blocks, and wherein for the $n^{th}$ block of the first ciphertext, the method further comprises:
    i) encrypting the $(n-1)^{th}$ block of the first ciphertext;
    ii) encrypting the $(n-1)^{th}$ block of the second ciphertext; and
    iii) performing an exclusive OR operation on the product of step i and the product of step ii to produce an nth swap key, and wherein performing an exclusive OR operation on the swap key and the first ciphertext is performed on the nth swap key and the nth block of the first ciphertext to produce an nth block of the second ciphertext.

11. The method according to embodiment 9, wherein the mode of operation is output feedback mode, wherein the first ciphertext comprises n blocks and wherein the second ciphertext comprises n blocks, and wherein for the second block of the first ciphertext, the method further comprises:
    i) encrypting the first encryption data to produce second block first encryption data;
    ii) encrypting the second encryption data to produce second block second encryption data; and
    iii) performing an exclusive OR operation on the second block first encryption data and the second block first encryption data to produce a second swap key, and wherein performing an exclusive OR operation on the swap key and the first ciphertext is performed on the second swap key and the second block of the first ciphertext to produce an second block of the second ciphertext.

12. The method according to embodiment 11, wherein for the $n^{th}$ block of the first ciphertext, the method further comprises:
   i) encrypting the $(n-1)^{th}$ block first encryption data to produce nth block first encryption data;
   ii) encrypting the $(n-1)^{th}$ block second encryption data to produce nth block second encryption data; and
   iii) performing an exclusive OR operation on the nth block first encryption data and the nth block second encryption data to produce an nth swap key, and wherein performing an exclusive OR operation on the swap key and the first ciphertext is performed on the nth swap key and the nth block of the first ciphertext to produce an nth block of the second ciphertext.

13. The method according to any one of embodiments 4 to 8, wherein encryption of the first concatenated vector is performed using the same encryption algorithm as encryption of the second concatenated vector.

14. The method according to any one of embodiments 4 to 8, wherein encryption of the first concatenated vector is performed using a different encryption algorithm to encryption of the second concatenated vector.

15. The method according to any one of embodiments 9 to 12, wherein encryption of the first initialisation vector is performed using the same encryption algorithm as encryption of the second initialisation vector.

16. The method according to any one of embodiments 9 to 12, wherein encryption of the first initialisation vector is performed using a different encryption algorithm to encryption of the second initialisation vector.

17. The method according to any preceding embodiment, wherein the first key and the second key are different lengths.

18. The method according to any one of embodiments 1 to 17, wherein the first key and the second key are the same length.

19. The method according to any one of embodiments 1 to 18, wherein the data encrypted with the first key is plaintext data which has been encrypted with the first key and not encrypted with the second key.

20. The method according to any one of embodiments 1 to 19, wherein the data encrypted with the second key is plaintext data which is encrypted with the second key and not encrypted with the first key.

21. A data processing apparatus comprising means for carrying out the steps of any preceding method embodiment.

22. A computer program comprising instructions which, when the program is executed by a computer, cause the computer to carry out the steps of any preceding method embodiment.

23. A computer-readable storage medium comprising instructions which, when executed by a computer, cause the computer to carry out the steps of any preceding method embodiment.

It will be appreciated that the invention has been described above by way of example only, and that modifications may be made within the scope of the invention as defined by the appendant claims.

The invention claimed is:

1. A computer-implemented method for processing a first ciphertext, wherein the first ciphertext is data encrypted with a first key and not encrypted with a second key, wherein the method is implemented using a block cipher and comprises:
   receiving a swap key, wherein the swap key is the product of an exclusive OR operation performed on the first key and the second key;
   receiving the first ciphertext, wherein the first ciphertext comprises a plurality of blocks; and
   performing an exclusive OR operation on the swap key and the first ciphertext to produce second ciphertext, such that the second ciphertext is the data encrypted with the second key and not encrypted with the first key.

2. The method according to claim 1, wherein a mode of operation of the block cipher is: counter mode; or Galois/counter mode; or output feedback mode; or cipher feedback mode.

3. The method according to claim 2, wherein the mode of operation is counter mode, and wherein, for a first block of the first ciphertext, the method further comprises:
   concatenating a first initialisation vector and a first counter value to produce a first concatenated vector;
   concatenating a second initialisation vector and the first counter value to produce a second concatenated vector;
   producing first encryption data by encrypting the first concatenated vector with the first key;
   producing second encryption data by encrypting the second concatenated vector with the second key; and
   performing an exclusive OR operation on the first and second encryption data to produce a first swap key, wherein performing an exclusive OR operation on the swap key and the first ciphertext is performed on the first swap key and the first block of the first ciphertext to produce a first block of the second ciphertext.

4. The method according to claim 3, wherein the first ciphertext comprises n blocks, and wherein for each of the second to nth blocks of the first ciphertext, the method further comprises:
   incrementing the counter value; and
   repeating the method of claim 3 using the incremented counter value.

5. The method according to claim 3, wherein the mode of operation is Galois/counter mode, and wherein the method further comprises:
   receiving a first authentication tag associated with the first ciphertext;
   receiving a second authentication tag associated with the second ciphertext;
   computing a third authentication tag using a Galois message authentication code function with the first ciphertext as the key;
   computing a fourth authentication tag using a Galois message authentication code function with the second ciphertext as the key;
   comparing the first and third authentication tags; and
   comparing the second and fourth authentication tags.

6. The method according to claim 5, wherein computing the third authentication tag comprises:
   i) performing Galois field multiplication on first authentication data to produce a first authentication stream;
   ii) performing an exclusive OR operation on the first authentication stream and the first block of the first ciphertext;
   iii) performing Galois field multiplication on the product of step ii;
   iv) repeating steps ii and iii for every block of the first ciphertext;
   v) performing Galois field multiplication on the product of step iv;

vi) performing an exclusive or operation on the product of step v and a first length authentication vector, wherein the length authentication vector is a length of the first authentication data concatenated with a length of the first ciphertext;

vii) performing Galois field multiplication on the product of step vi; and viii) performing an exclusive or operation on the product of step vii and the first encryption data.

7. The method according to claim 6, wherein computing the fourth authentication tag comprises performing the method of claim 6 on second authentication data, the second ciphertext, a second length authentication vector, and the second encryption data, wherein the second length authentication vector is a length of the second authentication data concatenated with a length of the second ciphertext.

8. The method according to claim 2, wherein for a first block of the first ciphertext, the method further comprises:
encrypting a first initialisation vector with the first key to produce first encryption data;
encrypting a second initialisation vector with the second key to produce second encryption data; and
performing an exclusive OR operation on the first and second encryption data to produce a first swap key, wherein performing an exclusive OR operation on the swap key and the first ciphertext is performed on the first swap key and the first block of the first ciphertext to produce a first block of the second ciphertext.

9. The method according to claim 8, wherein the mode of operation is cipher feedback mode, wherein the first ciphertext comprises n blocks, wherein the second ciphertext comprises n blocks, and wherein for the nth block of the first ciphertext, the method further comprises:
i) encrypting the $(n-1)^{th}$ block of the first ciphertext;
ii) encrypting the $(n-1)^{th}$ block of the second ciphertext; and
iii) performing an exclusive OR operation on the product of step i and the product of step ii to produce an nth swap key, wherein performing an exclusive OR operation on the swap key and the first ciphertext is performed on the nth swap key and the nth block of the first ciphertext to produce an nth block of the second ciphertext.

10. The method according to claim 8, wherein the mode of operation is output feedback mode, wherein the first ciphertext comprises n blocks and wherein the second ciphertext comprises n blocks, and wherein for the second block of the first ciphertext, the method further comprises:
i) encrypting the first encryption data to produce second block first encryption data;
ii) encrypting the second encryption data to produce second block second encryption data; and
iii) performing an exclusive OR operation on the second block first encryption data and the second block first encryption data to produce a second swap key, wherein performing an exclusive OR operation on the swap key and the first ciphertext is performed on the second swap key and the second block of the first ciphertext to produce an second block of the second ciphertext.

11. The method according to claim 10, wherein for the nth block of the first ciphertext, the method further comprises:
i) encrypting the $(n-1)^{th}$ block first encryption data to produce nth block first encryption data;
ii) encrypting the $(n-1)^{th}$ block second encryption data to produce nth block second encryption data; and
iii) performing an exclusive OR operation on the nth block first encryption data and the nth block second encryption data to produce an nth swap key, wherein performing an exclusive OR operation on the swap key and the first ciphertext is performed on the nth swap key and the nth block of the first ciphertext to produce an nth block of the second ciphertext.

12. A data processing apparatus for processing a first ciphertext using a block cipher, wherein the first ciphertext is data encrypted with a first key and not encrypted with a second key, the apparatus comprising:
at least one processor configured to:
receive a swap key, wherein the swap key is the product of an exclusive OR operation performed on the first key and the second key;
receive the first ciphertext, wherein the first ciphertext comprises a plurality of blocks; and
perform an exclusive OR operation on the swap key and the first ciphertext to produce second ciphertext, such that the second ciphertext is the data encrypted with the second key and not encrypted with the first key.

13. A non-transitory computer-readable storage medium for processing a first ciphertext using a block cipher, wherein the first ciphertext is data encrypted with a first key and not encrypted with a second key, wherein the non-transitory computer-readable storage medium comprises instructions which, when executed by a computer, cause the computer to carry out the steps of:
receiving a swap key, wherein the swap key is the product of an exclusive OR operation performed on the first key and the second key;
receiving the first ciphertext, wherein the first ciphertext comprises a plurality of blocks; and
performing an exclusive OR operation on the swap key and the first ciphertext to produce second ciphertext, such that the second ciphertext is the data encrypted with the second key and not encrypted with the first key.

14. The method according to claim 4, wherein the mode of operation is Galois/counter mode, and wherein the method further comprises:
receiving a first authentication tag associated with the first ciphertext;
receiving a second authentication tag associated with the second ciphertext;
computing a third authentication tag using a Galois message authentication code function with the first ciphertext as the key;
computing a fourth authentication tag using a Galois message authentication code function with the second ciphertext as the key;
comparing the first and third authentication tags; and
comparing the second and fourth authentication tags.

* * * * *